Nov. 5, 1940.  R. ECKARDT  2,220,068
PROTECTING DEVICE FOR AUTOMATIC MULTIPLE SPINDLE MACHINES
Filed July 14, 1938  2 Sheets-Sheet 1
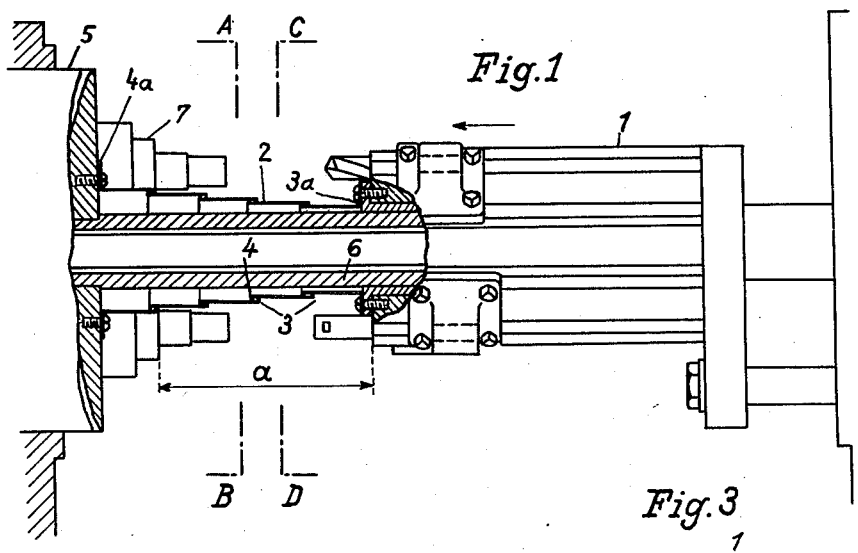
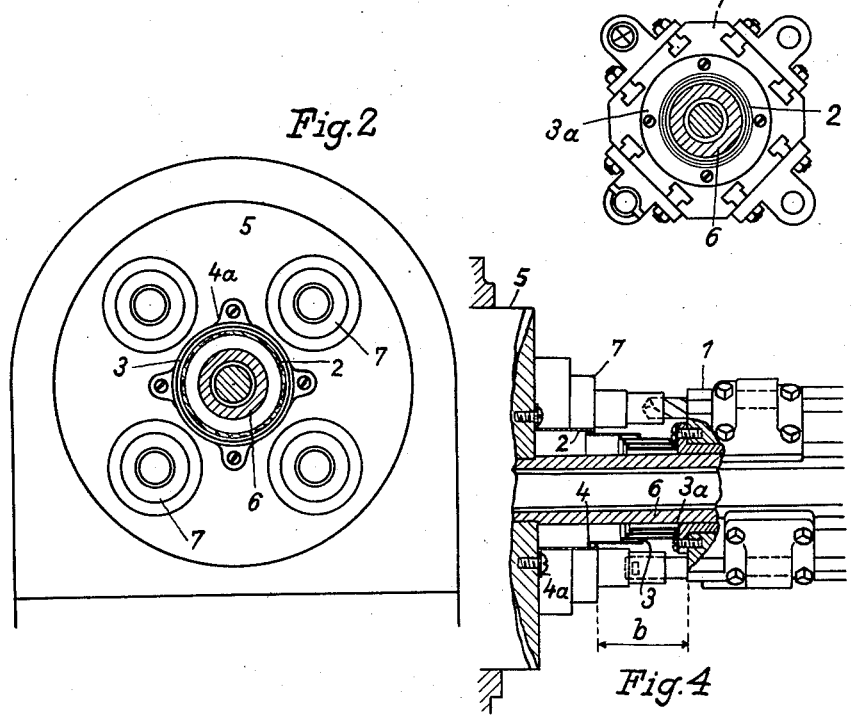
Inventor:
Rudolf Eckardt Nov. 5, 1940.    R. ECKARDT    2,220,068
PROTECTING DEVICE FOR AUTOMATIC MULTIPLE SPINDLE MACHINES
Filed July 14, 1938    2 Sheets-Sheet 2

Inventor:
Rudolf Eckardt
BY
Attorney

Patented Nov. 5, 1940

2,220,068

UNITED STATES PATENT OFFICE 2,220,068

PROTECTING DEVICE FOR AUTOMATIC MULTIPLE SPINDLE MACHINES

Rudolf Eckardt, Leipzig, Germany, assignor to The National Acme Company, Cleveland, Ohio, a corporation of Ohio Application July 14, 1938, Serial No. 219,145 In Germany September 15, 1937

3 Claims. (Cl. 29—37)

This invention relates to a protecting device for automatic multiple spindle machines and has for its object to provide a protecting device which prevents penetration of shavings and metal dust between the sliding tool carrier and the spindle carrier tube secured to the indexible work spindle carrier of the multiple spindle automatic machine and avoids premature wear of the guide surfaces.

In the hitherto known multiple spindle automatic machines having an indexible work spindle carrier on account of the varying distance arising on advance of the sliding tool carrier the arrangement and mounting of a suitable protecting device between the tool carrier and the work spindle carrier preventing shavings and cooling medium from contacting with the spindle carrier tube was not possible. Attempts were made by laying oil-cloth, wax-cloth or other cloth to prevent the penetration of shavings and cooling oil between the two contacting surfaces of the sliding tool carrier and the work spindle carrier tube, but reliable protection of the spindle carrier tube was never attained in this way.

According to the invention there are provided between the work spindle carrier and the sliding tool carrier around the spindle carrier tube several individual tube portions provided with turned over edges of comparatively short length which movably or telescopically engage in one another and in which the extreme members are secured to the tool carrier and to the work spindle carrier so that the individual tube portions on advance of the tool carrier towards the work spindle carrier move within one another and catch and lead away the falling shavings as well as the cooling oil flowing away and thus prevent contact of the shavings with the spindle carrier tube.

In a preferred embodiment of the protecting device the individual tube portions engaging in one another are provided on their overturned edges with packing inserts of felt or like material.

An embodiment of the invention is illustrated by way of example in the accompanying drawings:

Fig. 1 is a longitudinal section through the telescopic protecting device and the spindle carrier tube of the sliding tool carrier in the extreme position of the tool carrier in relation to the work spindle carrier.

Fig. 2 is a section on the line A—B of Fig. 1 looking towards the indexible work spindle carrier.

Fig. 3 is a section on the line C—D of Fig. 1 looking towards the tool carrier.

Fig. 4 is a longitudinal section similar to Fig. 1 but with the protecting device partly collapsed at the end of a working operation.

Figure 5:
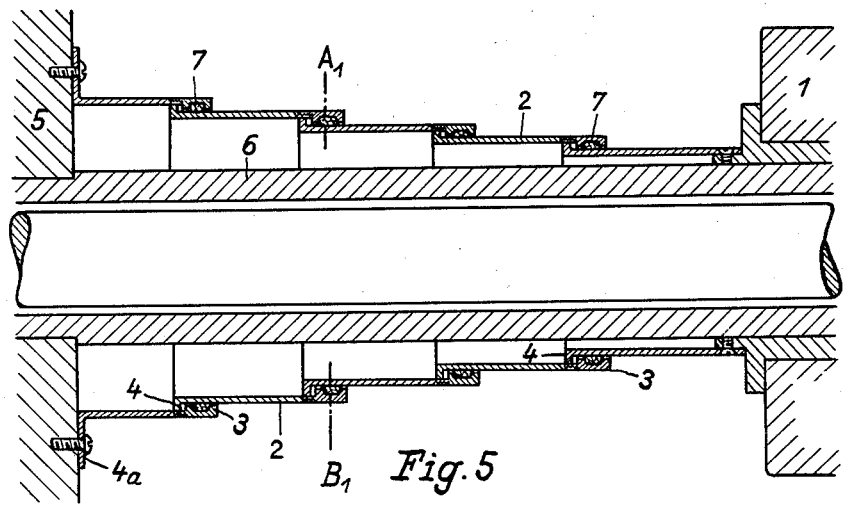
Fig. 5 shows in longitudinal section a modified arrangement of the protecting device with packing inserts of felt or the like, and Fig. 6 is a cross section on the line A'—B' of Fig. 5.

Referring to the drawings, the protecting device consists according to the working stroke $a$ of the slidable tool carrier 1 of two or more individual tube portions 2 which preferably engage in or over one another with two oppositely overturned edges 3 and 4. The two extreme tube portions 2 have at their outer sides flange portions 4a and 3a of which the one is screwed to the work spindle carrier 5 and the other to the tool carrier 1. The tube portions 2 engaging one another telescopically ensure tightness against the penetration of shavings, cooling medium and so on between the tool carrier 1 and the spindle carrier tube 6 of the work spindle carrier 5. 6' designates the central driving shaft.

On advance of the slidable tool carrier 1 towards the work spindle carrier 5 the separate tube portions 2 by the successive abutment of the flange 3a of the tube portion secured to the tool carrier against the overturned edges 3 of the separate tube portions 2 slide telescopically one within the other so that on reduction of the distance $a$ between the tool carrier 1 and the work spindles 7 for example to the length $b$ (Fig. 4) certain protection against the penetration of shavings, metal dust and cooling oil is always ensured.

Figures 6, 7:
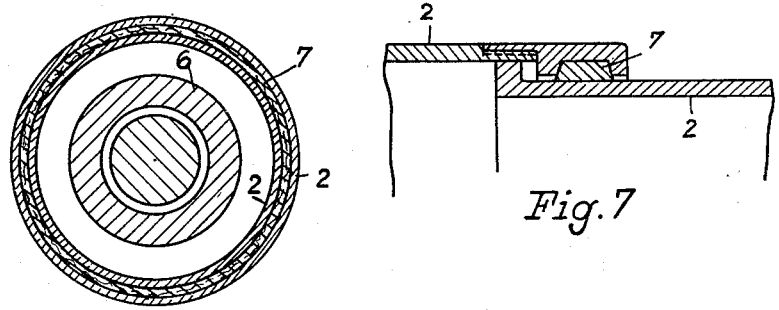
Fig. 7 shows in longitudinal section and to enlarged scale the arrangement of the packing.

For protection against the penetration of fine shavings and metal dust in the dry treatment of cast iron, brass, bronze, aluminium and the like the interengaging individual tube portions are preferably provided as shown in Figs. 5–7 at their overturned edges 3, 4 with packing rings 7 of felt or a suitable other packing material carried in an annular chamber of one set of tube portions.

What I claim is:

1. In a multiple spindle machine, the combination of an indexible work spindle carrier, a driving shaft, a work spindle carrier tube surrounding said driving shaft, a tool carrier slidable on said tube, and a protecting device for the tube and comprising a plurality of interlocking telescopic tube sections enclosing said tube, one of each pair also having an annular packing chamber, the end sections secured to the work spindle and tool carriers, respectively.

2. In a multiple spindle machine, the combination of an indexible work spindle carrier, a driving shaft, a work spindle carrier tube surrounding said driving shaft, a tool carrier slidable on said tube, and a protecting device for the tube and comprising a plurality of telescopic tube sections having interlocking overlapping flanges enclosing said tube, the end sections having flanges secured to the work spindle and tool carriers, respectively, one of each pair of said sections having in the rear of said interlocking flanges an annular chamber for the reception of packing means.

5. In a multiple spindle machine, the combination of an indexible work spindle carrier, a driving shaft, a work spindle carrier tube surrounding said driving shaft, a tool carrier slidable on said tube, and a protecting device for the tube and comprising a plurality of telescopic tube sections enclosing said tube, one of each pair of sections having a laterally extending flange and the other of the pair having a pair of laterally extending flanges forming therebetween a packing chamber for the reception of packing means, a laterally extending flange of each section adapted to contact the other when the sections are extended, the end sections constructed for attachment to the work spindle and tool carriers, respectively.

RUDOLF ECKARDT.